(12) United States Patent
Yang et al.

(10) Patent No.: US 9,279,044 B2
(45) Date of Patent: Mar. 8, 2016

(54) RUBBER COMPOSITION WITH MULTIPLE REINFORCING RESINS

(71) Applicants: Compagnie Generale des Etablissements Michelin, Clermont-Ferrand (FR); Michelin Recherche et Technique S.A., Granges-Paccot (CH)

(72) Inventors: Xiaofeng Shaw Yang, Simpsonville, SC (US); Jesse J. Arnold, Simpsonville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/430,511

(22) PCT Filed: Sep. 19, 2013

(86) PCT No.: PCT/US2013/060658
§ 371 (c)(1),
(2) Date: Mar. 23, 2015

(87) PCT Pub. No.: WO2014/052160
PCT Pub. Date: Apr. 3, 2014

(65) Prior Publication Data
US 2015/0225551 A1 Aug. 13, 2015

Related U.S. Application Data

(60) Provisional application No. 61/705,507, filed on Sep. 25, 2012.

(51) Int. Cl.
| | |
|---|---|
| *C08L 7/00* | (2006.01) |
| *C08K 3/04* | (2006.01) |
| *C08K 5/19* | (2006.01) |
| *C08K 5/13* | (2006.01) |
| *C08K 5/17* | (2006.01) |
| *C08K 5/18* | (2006.01) |
| *C08L 9/00* | (2006.01) |
| *B60C 15/00* | (2006.01) |
| *C08J 3/20* | (2006.01) |
| *B60C 1/00* | (2006.01) |

(52) U.S. Cl.
CPC ... *C08L 7/00* (2013.01); *B60C 1/00* (2013.01); *B60C 15/00* (2013.01); *C08J 3/203* (2013.01); *C08K 3/04* (2013.01); *C08K 5/13* (2013.01); *C08K 5/17* (2013.01); *C08K 5/18* (2013.01); *C08K 5/19* (2013.01); *C08L 9/00* (2013.01); *B60C 1/0016* (2013.04); *B60C 2015/042* (2013.01); *C08J 2307/00* (2013.01); *C08J 2461/06* (2013.01); *C08L 2312/00* (2013.01)

(58) Field of Classification Search
CPC ......... C08L 7/00; C08L 9/00; C08L 2312/00; C08K 5/13; C08K 5/17; C08K 5/18; B60C 1/0016
See application file for complete search history.

(56) References Cited

U.S. PATENT DOCUMENTS

| | | | |
|---|---|---|---|
| 6,541,551 B1 * | 4/2003 | Durairaj | C08K 5/16 524/248 |
| RE42,100 E | 2/2011 | Durairaj et al. | |
| 2003/0212185 A1 | 11/2003 | Vasseur | |

FOREIGN PATENT DOCUMENTS

| | | | | |
|---|---|---|---|---|
| CN | 101649079 A | * | 2/2010 | .............. C08L 21/00 |
| WO | WO 2010/017673 A1 | * | 2/2010 | |

OTHER PUBLICATIONS

International Search Report with Written Opinion dated Feb. 6, 2014.

* cited by examiner

*Primary Examiner* — Rip A Lee
(74) *Attorney, Agent, or Firm* — Frank J. Campigotto

(57) ABSTRACT

A tire component comprising a rubber composition having a highly unsaturated diene elastomer and a reinforcing filler with a first methylene acceptor selected from 3-hydroxydiphenylamine, 4-hydroxydiphenylamine or combinations thereof; a second methylene acceptor selected from a Novolac resin, diphenylolmethane, diphenylolethane diphenylolpropane, diphenylolbutane, a naphthol, a cresol or combinations thereof and a methylene donor. A method for manufacturing a tire component includes mixing together components of a rubber composition into a non-productive mix, the components including a highly unsaturated diene elastomer, a reinforcing filler, a first methylene acceptor selected from 3-hydroxydiphenylamine, 4-hydroxydiphenylamine or combinations thereof and a second methylene acceptor selected from a Novolac resin, diphenylolmethane, diphenylolethane diphenylolpropane, diphenylolbutane, a naphthol, a cresol or combinations thereof; and mixing a methylene donor and a vulcanizing agent into the non-productive mix to convert the non-productive mix to a productive mix.

21 Claims, No Drawings

RUBBER COMPOSITION WITH MULTIPLE REINFORCING RESINS

BACKGROUND OF THE INVENTION

1. Field of the Invention

This invention relates generally to rubber compositions and more particularly to rubber compositions having multiple reinforcing resins, methods for making them and articles made from such rubber compositions.

2. Description of the Related Art

Tires and other articles that are made of rubber are manufactured from rubber compositions that include rubber, e.g., natural rubber, synthetic rubber or combinations thereof, as well as fillers, plasticizers, vulcanizing agents and other chemicals that improve the physical characteristics of the cured rubber composition. One class of materials that may be added to the rubber compositions is resin.

Resins are typically (but not always) nonvolatile, solid organic substances that are produced naturally by plants or synthetically from petrochemicals or other sources of hydrocarbon materials. As used in rubber compositions, resins may be classified as either reinforcing resins or as plasticizing resins. Plasticizing resins are added to a rubber composition to improve the plasticity or workability of a rubber composition. They are often added as a substitute for or in addition to a processing oil and are known to improve the resulting physical characteristics of the cured rubber composition.

Reinforcing resins are added to a rubber composition to increase the rigidity of the cured rubber composition. These reinforcing resins intermix with the rubber polymer chains and, when reacted with a linking agent or with each other, form a three-dimensional network that improves the physical characteristics of the cured rubber composition. Many of these resins are classified as being methylene acceptor/donor systems that react together to generate a three-dimensional reinforcing resin network by a condensation reaction.

SUMMARY OF THE INVENTION

Particular embodiments of the present invention include rubber compositions, articles made from such rubber compositions and methods for making same. Such embodiments include a tire component, the tire component comprising a rubber composition that is based upon a cross-linkable elastomer composition, the cross-linkable rubber composition comprising, per 100 parts by weight of rubber (phr) a highly unsaturated diene elastomer and a reinforcing filler with a first methylene acceptor selected from 3-hydroxydiphenyl-amine, 4-hydroxydiphenyl-amine or combinations thereof. Such rubber compositions further include a second methylene acceptor selected from a Novolac resin, diphenylolmethane, diphenylolethane diphenylolpropane, diphenylolbutane, a naphthol, a cresol or combinations thereof and a methylene donor.

The ratio of the first methylene acceptor to the second methylene acceptor may be between 4:1 and 1:4 by weight and in particular embodiments the second methylene acceptor may be a Novolac resin.

Methods that are embodiments of the present invention include methods for manufacturing a tire component, such methods comprising mixing together components of a rubber composition into a non-productive mix, the components including a highly unsaturated diene elastomer, a reinforcing filler, a first methylene acceptor selected from 3-hydroxy-diphenylamine, 4-hydroxydiphenyl-amine or combinations thereof and a second methylene acceptor selected from a Novolac resin, diphenylolmethane, diphenylolethane diphenylolpropane, diphenylolbutane, a naphthol, a cresol or combinations thereof.

Such methods may further include cooling the non-productive mix and mixing a methylene donor and a vulcanizing agent into the non-productive mix to convert the non-productive mix to a productive mix. In particular embodiments, the method may further include forming the tire component from the productive mix.

The foregoing and other objects, features and advantages of the invention will be apparent from the following more detailed descriptions of particular embodiments of the invention.

DESCRIPTION OF PARTICULAR EMBODIMENTS

Particular embodiments of the present invention include rubber compositions that contain at least two different methylene acceptors, one selected from 3-hydroxydiphenylamine (3-HDPA) and/or 4-hydroxydiphenylamine (4-HDPA) and the other selected from phenolic resins. Both types of these methylene acceptors are useful in rubber compositions as the methylene acceptor component in methylene acceptor/donor systems. In such systems the methylene donor reacts with the methylene acceptor to generate a three-dimensional reinforcing resin network by a condensation reaction that, when formed in the rubber composition, provides it, inter alia, with increased rigidity.

Surprisingly it has been discovered that when a second methylene acceptor is mixed into a rubber composition with 4-HDPA and/or 3-HDPA as part of a methylene acceptor/donor system, a synergistic effect results in significant improvements in the cured rubber composition's rigidity without a significant degradation in the compositions green viscosity or its cured cohesiveness.

As used herein, "diene elastomer" and "rubber" are synonymous terms and may be used interchangeably.

As used herein, a "non-productive" mix includes many of the components of a rubber composition but includes no vulcanization agents or typically no primary accelerators. A "productive" mix results after the vulcanization agents and typically any primary accelerators are added to the non-productive mix.

As used herein, "HDPA" is a generic term referring to 3-HDPA, 4-HDPA and combinations thereof.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

Reference will now be made in detail to embodiments of the invention, provided by way of explanation of the invention. For example, features illustrated or described as part of one embodiment can be used with another embodiment to yield still a third embodiment. It is intended that the present invention include these and other modifications and variations.

The rubber compositions disclosed herein are useful for many types of articles that are made of rubber, including tire components, hoses, conveyor belts and so forth. Since these rubber compositions, upon curing, may be characterized as having high rigidity, they are particularly useful for the manufacture of tire components where high rigidity properties are often desired such as in the bead area, e.g., the apex, bead filler and chafer and also in the tire tread, including retread rubber useful for retreading a tire.

As previously noted, the rubber compositions disclosed herein that provide the surprising increase in rigidity with little degradation in the green rubber viscosity and in the cured cohesion properties comprise two different types of methylene acceptors. In addition to the HDPA, a second methylene acceptor of the phenolic type is incorporated into the rubber composition.

Suitable second methylene acceptors include phenols, the generic name for hydroxylated derivatives of benzene and equivalent compounds. This definition covers in particular monophenols, for example phenol or hydroxybenzene, bisphenols, polyphenols (polyhydroxyarenes), substituted phenols such as alkylphenols or aralkylphenols, for example bisphenols, diphenylolpropane, diphenylolmethane, naphthols, cresol, t-butylphenol, octylphenol, nonylphenol, xylenol, resorcinol or analogous products.

Particularly useful second methylene acceptors are the Novolac resins. These resins are phenol-aldehyde pre-condensates resulting from the condensation of phenolic compounds and aldehydes, in particular formaldehyde. Novolac resins (also referred to as "two-step resins"), just as do the other methylene acceptors, require the use of a methylene donor as a curing agent to crosslink the Novolac resins in the rubber composition, thereby creating the three dimensional resin networks. Such curing normally takes place above 100° C.

Particular embodiments of the rubber compositions disclosed herein include the second methylene acceptor selected from a Novolac resins, diphenylolmethane, diphenylolethane, diphenylolpropane, diphenylolbutane, a naphthol, a cresol or combinations thereof. Any of the methylene acceptors disclosed herein or that are otherwise known to those skilled in the art to be suitable for the purpose may be used in particular embodiments of the rubber compositions either singularly or in combination.

Suitable methylene donors may be selected from, for example, hexamethylenetetramine (HMT); hexamethoxymethylmelamine (HMMM); formaldehyde; paraformaldehyde; trioxane; 2-methyl-2-nitro-1-propanal; substituted melamine resins such as N-substituted oxymethylmelamine resins; glycoluril compounds such as tetramethoxymethyl glycoluril; urea-formaldehyde resins such as butylated urea-formaldehyde resins; or mixtures thereof. Hexamethylenetetramine (HMT), hexamethoxymethylmelamine (HMMM) or mixtures thereof are preferred methylene donors in particular embodiments.

In particular embodiments the total amount of the HDPA and the second methylene acceptors may be present in the rubber compositions at between 2 phr and 30 phr or alternatively between 5 phr and 25 phr, 10 phr and 30 phr, between 10 phr and 20 phr or between 3 phr and 15 phr. In particular embodiments, the ratio of the HDPA to the second methylene acceptor may be between 4:1 and 1:4 by weight or alternatively, between 2:1 and 1:2 by weight. As noted, the HDPA may be added to the rubber composition as 3-hydroxydiphenylamine (3-HDPA), 4-hydroxydiphenylamine (4-HDPA) or as combinations thereof. 3-HDPA is available from Santa Cruz Biotechnology, Inc. with offices in California and 4-HDPA is available from NeoSources International with offices in Texas.

The methylene donor is added to the rubber composition as needed to provide the desired cross-linking with the methylene acceptors in an amount, for example, of between 8 wt. % and 80 wt. % of the total weight of the methylene acceptors in the rubber composition or alternatively between 10 wt. % and 60 wt. %, between 10 wt. % and 40 wt. % or between 15 wt. % and 35 wt. %. In particular embodiments, the methylene donor may be added to the rubber composition in an amount of between 0.5 phr and 15 phr or alternatively between 1 phr and 10 phr. In particular embodiments, a ratio of the total amount of first and second methylene acceptors to the methylene donors is between 1:1 and 10:1 by weight.

The useful elastomers of the rubber composition disclosed herein include highly unsaturated diene elastomers. Diene elastomers or rubber is understood to mean those elastomers resulting at least in part (i.e., a homopolymer or a copolymer) from diene monomers (monomers bearing two double carbon-carbon bonds, whether conjugated or not). Essentially unsaturated diene elastomers are understood to mean those diene elastomers that result at least in part from conjugated diene monomers, having a content of members or units of diene origin (conjugated dienes) that are greater than 15 mol. %.

Thus, for example, diene elastomers such as butyl rubbers, nitrile rubbers or copolymers of dienes and of alpha-olefins of the ethylene-propylene diene terpolymer (EPDM) type or the ethylene-vinyl acetate copolymer type, do not fall within the preceding definition and may in particular be described as "essentially saturated" diene elastomers (low or very low content of units of diene origin, i.e., less than 15 mol. %). Particular embodiments of the present invention include no essentially saturated diene elastomers.

Within the category of essentially unsaturated diene elastomers are the highly unsaturated diene elastomers, which are understood to mean in particular diene elastomers having a content of units of diene origin (conjugated dienes) that is greater than 50 mol. %. Particular embodiments of the present invention may include not only no essentially saturated diene elastomers but also no essentially unsaturated diene elastomers that are not highly unsaturated.

The rubber elastomers suitable for use with particular embodiments of the present invention include highly unsaturated diene elastomers, for example, polybutadienes (BR), polyisoprenes (IR), natural rubber (NR), butadiene copolymers, isoprene copolymers and mixtures of these elastomers. The polyisoprenes include synthetic cis-1,4 polyisoprene, which may be characterized as possessing cis-1,4 bonds at more than 90 mol. % or alternatively, at more than 98 mol. %.

Also suitable for use in particular embodiments of the present invention are rubber elastomers that are copolymers and include, for example, butadiene-styrene copolymers (SBR), butadiene-isoprene copolymers (BIR), isoprene-styrene copolymers (SIR) and isoprene-butadiene-styrene copolymers (SBIR) and mixtures thereof.

It should be noted that any of the highly unsaturated elastomers may be utilized in particular embodiments as a functionalized elastomer. Elastomers can be functionalized by reacting them with suitable functionalizing agents prior to or in lieu of terminating the elastomer. Exemplary functionalizing agents include, but are not limited to, metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates, imines, and epoxides. These types of functionalized elastomers are known to those of ordinary skill in the art. While particular embodiments may include one or more of these functionalized elastomers solely as the rubber component, other embodiments may include one or more of these functionalized elastomers mixed with one or more of the non-functionalized highly unsaturated elastomers.

In addition to the rubber component and the methylene acceptors/methylene donor system, a reinforcing filler is included in the rubber compositions disclosed herein. Reinforcing fillers are well known in the art and include, for example, carbon blacks and silica. Any reinforcing filler known to those skilled in the art may be used in the rubber composition either by themselves or in combination with other reinforcing fillers. In particular embodiments of the rubber composition disclosed herein, the filler is essentially a carbon black.

Carbon black, which is an organic filler, is well known to those having ordinary skill in the rubber compounding field. The carbon black included in the rubber compositions produced by the methods disclosed herein may, in particular embodiments for example, be in an amount of between 40 phr and 150 phr or alternatively between 50 phr and 100 phr.

Suitable carbon blacks are any carbon blacks known in the art and suitable for the given purpose. Suitable carbon blacks of the type HAF, ISAF and SAF, for example, are conventionally used in tire treads. Non-limitative examples of carbon blacks include, for example, the N115, N134, N234, N299, N326, N330, N339, N343, N347, N375 and the 600 series of carbon blacks, including, but not limited to N630, N650 and N660 carbon blacks.

As noted above, silica may also be useful as reinforcement filler. The silica may be any reinforcing silica known to one having ordinary skill in the art including, for example, any precipitated or pyrogenic silica having a BET surface area and a specific CTAB surface area both of which are less than 450 m$^2$/g or alternatively, between 30 and 400 m$^2$/g may be suitable for particular embodiments based on the desired properties of the cured rubber composition. Particular embodiments of rubber compositions disclosed herein may include a silica having a CTAB of between 80 and 200 m$^2$/g, between 100 and 190 m$^2$/g, between 120 and 190 m$^2$/g or between 140 and 180 m$^2$/g. The CTAB specific surface area is the external surface area determined in accordance with Standard AFNOR-NFT-45007 of November 1987.

Highly dispersible precipitated silicas (referred to as "HDS") may be useful in particular embodiments of such rubber compositions disclosed herein, wherein "highly dispersible silica" is understood to mean any silica having a substantial ability to disagglomerate and to disperse in an elastomeric matrix. Such determinations may be observed in known manner by electron or optical microscopy on thin sections. Examples of known highly dispersible silicas include, for example, Perkasil KS 430 from Akzo, the silica BV3380 from Degussa, the silicas Zeosil 1165 MP and 1115 MP from Rhodia, the silica Hi-Sil 2000 from PPG and the silicas Zeopol 8741 or 8745 from Huber.

When silica is added to the rubber composition, a proportional amount of a silane coupling agent is also added to the rubber composition. The silane coupling agent is a sulfur-containing organosilicon compound that reacts with the silanol groups of the silica during mixing and with the elastomers during vulcanization to provide improved properties of the cured rubber composition. A suitable coupling agent is one that is capable of establishing a sufficient chemical and/or physical bond between the inorganic filler and the diene elastomer; which is at least bifunctional, having, for example, the simplified general formula "Y-T-X", in which: Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica); X represents a functional group ("X" function) which is capable of bonding physically and/or chemically with the diene elastomer, for example by means of a sulfur atom; T represents a divalent organic group making it possible to link Y and X.

Any of the organosilicon compounds that contain sulfur and are known to one having ordinary skill in the art are useful for practicing embodiments of the present invention. Examples of suitable silane coupling agents having two atoms of silicon in the silane molecule include 3,3'-bis(triethoxysilylpropyl)disulfide and 3,3'-bis(triethoxy-silylpropyl)tetrasulfide (known as Si69). Both of these are available commercially from Degussa as X75-S and X50-S respectively, though not in pure form. Degussa reports the molecular weight of the X50-S to be 532 g/mole and the X75-S to be 486 g/mole. Both of these commercially available products include the active component mixed 50-50 by weight with a N330 carbon black. Other examples of suitable silane coupling agents having two atoms of silicon in the silane molecule include 2,2'-bis(triethoxysilylethyl)tetrasulfide, 3,3'-bis(tri-t-butoxy-silylpropyl)disulfide and 3,3'-bis(di t-butylmethoxysilylpropyl)tetrasulfide. Examples of silane coupling agents having just one silicon atom in the silane molecule include, for example, 3,3'(triethoxysilylpropyl)disulfide and 3,3' (triethoxy-silylpropyl)tetrasulfide. The amount of silane coupling agent can vary over a suitable range as known to one having ordinary skill in the art. Typically the amount added is between 7 wt. % and 15 wt. % or alternatively between 8 wt. % and 12 wt. % or between 9 wt. % and 11 wt. % of the total weight of silica added to the rubber composition.

Particular embodiments of the rubber compositions disclosed herein may include no processing oil or very little, such no more than 5 phr. Processing oils are well known to one having ordinary skill in the art, are generally extracted from petroleum and are classified as being paraffinic, aromatic or naphthenic type processing oil, including MES and TDAE oils. Processing oils are also known to include, inter alia, plant-based oils, such as sunflower oil, rapeseed oil and vegetable oil. Some of the rubber compositions disclosed herein may include an elastomer, such as a styrene-butadiene rubber, that has been extended with one or more such processing oils but such oil is limited in the rubber composition of particular embodiments as being no more than 10 phr of the total elastomer content of the rubber composition.

The rubber compositions disclosed herein may further include, in addition to the compounds already described, all or part of the components often used in diene rubber compositions intended for the manufacture of tires, such as plasticizers, pigments, protective agents of the type that include antioxidants and/or antiozonants, vulcanization retarders, a vulcanization system based, for example, on sulfur or on a peroxide, vulcanization accelerators, vulcanization activators, extender oils and so forth. There may also be added, if desired, one or more conventional non-reinforcing fillers such as clays, bentonite, talc, chalk or kaolin.

The vulcanization system is preferably, for particular embodiments, one based on sulfur and on an accelerator but other vulcanization agents known to one skilled in the art may be useful as well. Vulcanization agents as used herein are those materials that cause the cross-linkage of the rubber and therefore may be added only to the productive mix so that premature curing does not occur, such agents including, for example, sulfur and peroxides. Use may be made of any compound capable of acting as an accelerator of the vulcanization of elastomers in the presence of sulfur, in particular those chosen from the group consisting of 2-mercaptobenzothiazyl disulfide (abbreviated to "MBTS"), N-cyclohexyl- 2-benzothiazolesulphenamide (abbreviated to "CBS"), N,N-dicyclohexyl-2-benzothiazolesulphenamide (abbreviated to "DCBS"), N-tert-butyl-2-benzothiazolesulphenamide (abbreviated to "TBBS"), N-tert-butyl-2-benzothiazole-sulphenimide (abbreviated to "TBSI") and the mixtures of these compounds. Preferably, a primary accelerator of the sulfenamide type is used.

The vulcanization system may further include various known secondary accelerators or vulcanization activators, such as zinc oxide, stearic acid and guanidine derivatives (in particular diphenylguanidine).

The rubber compositions that are embodiments of the present invention may be produced in suitable mixers in a manner known to those having ordinary skill in the art. Typically the mixing may occur using two successive preparation phases, a first phase of thermo-mechanical working at high temperature followed by a second phase of mechanical working at a lower temperature.

The first phase, sometimes referred to as a "non-productive" phase, includes thoroughly mixing, typically by kneading, the various ingredients of the composition but excluding the vulcanization system and the methylene donor. It is carried out in a suitable kneading device, such as an internal mixer of the Banbury type, until under the action of the mechanical working and the high shearing imposed on the mixture, a maximum temperature of generally between 120° C. and 190° C. is reached, indicating that the components are well dispersed.

After cooling the mixture a second phase of mechanical working is implemented at a lower temperature. Sometimes referred to a "productive" phase, this finishing phase consists of incorporating the vulcanization system and the methylene donor into the rubber composition using a suitable device, such as an open mill. It is performed for an appropriate time (typically, for example, between 1 and 30 minutes or between 2 and 10 minutes), and at a sufficiently low temperature, i.e., lower than the vulcanization temperature of the mixture and lower than the cross-linking temperature of the methylene donor/acceptor system, so as to protect against premature vulcanization or resinification cross-linking.

The rubber composition can be formed into useful articles, including tire components. Tire treads, for example, may be formed as tread bands and then later made a part of a tire or they be formed directly onto a tire carcass by, for example, extrusion and then cured in a mold. Other components such as those located in the bead area of the tire or in the sidewall may be formed and assembled into a green tire and then cured with the curing of the tire.

The invention is further illustrated by the following examples, which are to be regarded only as illustrations and not delimitative of the invention in any way. The properties of the compositions disclosed in the examples were evaluated as described below.

Mooney Plasticity (ML 1+4) was measured in accordance with ASTM Standard D1646. In general, the composition in an uncured state is molded in a cylindrical enclosure and heated to 100° C. After 1 minute of preheating, the rotor turns within the test sample at 2 rpm, and the torque used for maintaining this movement is measured after 4 minutes of rotation. The Mooney Plasticity is expressed in "Mooney units" (MU, with 1 MU=0.83 Newton-meter).

Moduli of elongation (MPa) were measured at 10% (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

Shore A hardness of the compositions after curing was assessed in accordance with ASTM Standard D 2240-97.

The elongation property was measured as elongation at break (%) and the corresponding elongation stress (MPa), which is measured at 23° C. in accordance with ASTM Standard D412 on ASTM C test pieces. The elongation index is determined as the product of the elongation stress at break (N/mm) and the elongation at break (%) divided by 100.

Tear properties were measured on test samples cut from a cured plaque with a thickness of approximately 2.5 mm. Notches (perpendicular to the test direction) were created in the samples prior to testing. The force and elongation at break was measured using an Instron 5565 Uniaxial Testing System. The cross-head speed was 500 mm/min. Samples were tested at 23° C. and at 100° C. The tear index is determined as the product of the tear force (N/mm) and the tear strain at break (%) divided by 100.

EXAMPLE 1

This example provides a comparison of various rubber compositions that include no resin system (W1), a singular resin system (W2-W4) and a mixture of resin systems (F1-F2) that provide the synergistic effect of increased rigidity of the composition. The formulations were prepared with the component amounts shown in Table 1. The 4-HDPA was obtained from NeoSources International with offices in Texas.

The vulcanization package included sulfur, accelerators and vulcanization activators, e.g., stearic acid and zinc oxide, as known to those having ordinary skill in the art.

TABLE 1

| | \multicolumn{6}{c}{Formulations} | | | | | |
|---|---|---|---|---|---|---|
| | W1 | W2 | W3 | W4 | F1 | F2 |
| Components | | | | | | |
| NR | 100 | 100 | 100 | 100 | 100 | 100 |
| Carbon Black, N326 | 70 | 70 | 70 | 70 | 70 | 70 |
| Novolac Resin | | 6 | | | 3 | |
| Bisphenol A | | | 6 | | | 3 |
| 4-HDPA | | | | 6 | 3 | 3 |
| Hexamethylenetetramine | | 1.5 | 1.5 | 1.5 | 1.5 | 1.5 |
| 6PPD | 1.5 | 1.5 | 1.5 | 1.5 | 1.5 | 1.5 |
| Vulcanization Pkg. | 12 | 12 | 12 | 12 | 12 | 12 |
| Uncured Properties | | | | | | |
| Mooney ML 1 + 4 | 77 | 90 | 82 | 77 | 83 | 76 |
| Cured Properties | | | | | | |
| MA10, MPa | 9.5 | 18.1 | 18.7 | 18.7 | 22.1 | 23.0 |
| Shore A Hardness | 75.6 | 84.2 | 84.6 | 84.5 | 87.1 | 87.9 |
| Elongation Stress, MPa | 25 | 17 | 16 | 21 | 22 | 20 |
| Elongation at Break, % | 356 | 242 | 248 | 337 | 320 | 317 |
| Elongation Index | 89 | 41 | 40 | 71 | 70 | 63 |
| Tear Force @ 23° C., N/mm | 50 | 45 | 53 | 68 | 60 | 53 |
| Tear Strain @ 23° C., % | 115 | 89 | 103 | 136 | 112 | 106 |
| Tear Index @ 23° C. | 58 | 40 | 55 | 92 | 67 | 56 |
| Tear Force @ 100° C., N/mm | 26 | 23 | 29 | 28 | 28 | 30 |
| Tear Strain @ 100° C., % | 81 | 58 | 76 | 83 | 70 | 77 |
| Tear Index @ 100° C. | 21 | 13 | 22 | 23 | 20 | 23 |

For each of the formulations described in Table 1, the natural rubber and all the other materials except for the sulfur, accelerators and the hexamethylenetetramine were added to a Banbury mixer and processed until well incorporated. The mixture was then dropped from the mixer and transferred to a mill where it was cooled.

The vulcanization package and the hexamethylenetetramine were added into the cooled mixture on the mill and the productive mix was milled for a time until the components were well mixed. The product was then tested for its properties in accordance with the testing procedures described above. For the cured properties, the product was cured for 25 minutes at 150° C.

As may be seen from the results in Table 1, the rigidity of the two formulations having both the HDPA and a second methylene acceptor was surprisingly significantly higher than any of the witness formulations. Likewise there was a significant increase in the Shore A hardness. It should also be noted that the Mooney viscosity of the green rubber composition did not significantly increase as would be expected with the increase in rigidity caused by the addition of the resin nor did the cohesive properties significantly deteriorate.

EXAMPLE 2

This example provides a comparison of various rubber compositions that include a singular resin system (W5-W7) and a mixture of resin systems (F3-F4) that provide the synergistic effect of increased rigidity of the composition using 3-HDPA provided by Indspec. The formulations were prepared with the component amounts shown in Table 2.

The vulcanization package included sulfur, accelerators and vulcanization activators, e.g., stearic acid and zinc oxide, as known to those having ordinary skill in the art.

The modified Novolac resin PN160 was provided by Cytec and the resorcinol Novolac resin B19 was provided by Indspec.

Each of the formulations described in Table 2 were mixed, cured and tested in the same way as described in Example 1. The physical properties of the rubber compositions are also shown in Table 2.

TABLE 2

| | Formulations | | | | |
|---|---|---|---|---|---|
| | W5 | W6 | W7 | F3 | F4 |
| Components | | | | | |
| NR | 100 | 100 | 100 | 100 | 100 |
| Carbon Black, N234 | 50 | 50 | 50 | 50 | 50 |
| Modified Novolac PN160 | 6 | | | 3 | |
| Penacolite B19 | | 6 | | | 3 |
| 3-HDPA | | | 6 | 3 | 3 |
| Hexamethylenetetramine | 2 | 2 | 2 | 2 | 2 |
| 6PPD | 2 | 2 | 2 | 2 | 2 |
| Vulcanization Pkg. | 10.5 | 10.5 | 10.5 | 10.5 | 10.5 |
| Uncured Properties | | | | | |
| Mooney ML 1 + 4 | 79 | 90 | 75 | 78 | 85 |
| Cured Properties | | | | | |
| MA10, MPa | 12.0 | 10.1 | 15.2 | 14.4 | 13.2 |
| Shore A Hardness | 80.7 | 77.9 | 84.8 | 83.4 | 81.9 |
| Elongation Stress, MPa | 24.9 | 22.9 | 24.9 | 26.3 | 25.9 |
| Elongation at Break, % | 395 | 343 | 419 | 435 | 417 |
| Elongation Index @23° C. | 98 | 79 | 104 | 114 | 108 |
| Tear Force @23° C., N/mm | 64 | 43 | 70 | 69 | 78 |
| Tear Strain @ 23° C., % | 146 | 105 | 165 | 166 | 173 |
| Tear Index @ 23° C. | 93 | 45 | 116 | 115 | 136 |
| Tear Force @100° C., N/mm | 24 | 26 | 30 | 32 | 30 |
| Tear Strain @ 100° C., % | 74 | 83 | 86 | 98 | 92 |
| Tear Index @ 100° C. | 17 | 22 | 26 | 31 | 27 |

Again, as may be seen in the results of Table 2, the rigidity of the two formulations having both the HDPA and the second methylene acceptor show the synergic effect of the combined resins. The synergistic effect may be seen, for example, from the weighted average of the results of the corresponding witnesses compared to the inventive compositions; i.e., the MA10 weighted averages of W5 and W7 are 13.6 MPa compared to the MA10 of F3 of 14.4 MPa. Also it may be seen that the cohesive properties were improved in the inventive formulations over the witness formulations.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A rubber composition that is based upon a cross-linkable elastomer composition, the cross-linkable rubber composition comprising, per 100 parts by weight of rubber (phr):
 a highly unsaturated diene elastomer;
 a reinforcing filler;
 a first methylene acceptor selected from 3-hydroxydiphenylamine, 4-hydroxydiphenylamine or combinations thereof;
 a second methylene acceptor selected from a novolac resin, diphenylolmethane, diphenylolethane diphenylolpropane, diphenylolbutane, a naphthol, a cresol or combinations thereof; and
 a methylene donor.

2. A tire component of a tire, the tire component comprising a rubber composition that is based upon a cross-linkable elastomer composition, the cross-linkable rubber composition comprising, per 100 parts by weight of rubber (phr):
 a highly unsaturated diene elastomer;
 a reinforcing filler;
 a first methylene acceptor selected from 3-hydroxydiphenylamine, 4-hydroxydiphenylamine or combinations thereof;
 a second methylene acceptor selected from a novolac resin, diphenylolmethane, diphenylolethane diphenylolpropane, diphenylolbutane, a naphthol, a cresol or combinations thereof; and
 a methylene donor.

3. The tire component of claim 2, wherein a ratio of the first methylene acceptor to the second methylene acceptor is between 4:1 and 1:4 by weight.

4. The tire component of claim 2, wherein a ratio of the first methylene acceptor to the second methylene acceptor is between 2:1 and 1:2 by weight.

5. The tire component of claim 2, wherein the methylene donor is selected from hexamethylenetetramine, hexamethoxymethylmelamine or combinations thereof.

6. The tire component of claim 2, wherein a total amount of the first and second methylene acceptors is between 2 phr and 30 phr.

7. The tire component of claim 6, wherein a total amount of the first and second methylene acceptors is between 3 phr and 15 phr.

8. The tire component of claim 2, wherein the second methylene acceptor is a novolac resin.

9. The tire claim 2, wherein the first methylene acceptor is 3-hydroxydiphenylamine.

10. The tire claim 2, wherein the first methylene acceptor is 4-hydroxydiphenylamine.

11. The tire component of claim 2, wherein the methylene donor is in an amount of between 0.5 phr and 15 phr.

12. The tire component of claim 11, wherein the methylene donor is in an amount of between 1 phr and 10 phr.

13. The tire component of claim 2, wherein a ratio of the total amount of first and second methylene acceptors to the methylene donor is between 1:1 and 10:1 by weight.

14. The tire component of claim 2, wherein highly unsaturated diene elastomer is selected from a polybutadiene, a synthetic polyisoprene, a natural rubber, a butadiene-styrene copolymer or combinations thereof.

15. The tire component of claim 2, wherein the reinforcing filler is selected from a carbon black, a silica or combinations thereof.

16. The tire component of claim 2, wherein the tire component is a tire tread.

17. The tire component of claim 2, wherein the tire component is a bead component of the tire.

18. A method for manufacturing a tire component, the method comprising:
    mixing together components of a rubber composition into a non-productive mix, the components including a highly unsaturated diene elastomer, a reinforcing filler, a first methylene acceptor selected from 3-hydroxydiphenylamine, 4-hydroxydiphenylamine or combinations thereof and a second methylene acceptor selected from a Novolac resin, diphenylolmethane, diphenylolethane diphenylolpropane, diphenylolbutane, a naphthol, a cresol or combinations thereof;
    cooling the non-productive mix;
    mixing a methylene donor and a vulcanizing agent into the non-productive mix to convert the non-productive mix to a productive mix;
    forming the tire component from the productive mix.

19. The method of claim 18, wherein a ratio of the first methylene acceptor to the second methylene acceptor is between 4:1 and 1:4 by weight.

20. The method of any one of claim 18, wherein the methylene donor is selected from hexamethylenetetramine, hexamethoxymethylmelamine or combinations thereof.

21. The method of any one of claim 18, wherein the second methylene acceptor is a novolac resin.

* * * * *